United States Patent [19]

Peruglia

[11] 3,738,607

[45] June 12, 1973

[54] SOLENOID-OPERATED, TWO-WAY, TWO-POSITION VALVE WITH BIDIRECTIONAL FLOW

[75] Inventor: Marco Peruglia, Turin, Italy

[73] Assignee: Fiat Societa per Azioni, Turin, Italy

[22] Filed: July 26, 1971

[21] Appl. No.: 166,154

[30] Foreign Application Priority Data

Feb. 26, 1971 Italy .............................. 67678 A/71

[52] U.S. Cl. .................................. 251/30, 251/45
[51] Int. Cl. ..................... F16k 31/385, F16k 31/06
[58] Field of Search .......................... 251/45, 34, 30

[56] References Cited
UNITED STATES PATENTS 2,480,712   8/1949   Carbon ........................... 251/44 X
3,010,691   11/1961  Canfield .............................. 251/30
3,324,673   6/1967   Lindahl et al. .................. 251/368 X
3,459,403   8/1969   Royer .................................. 251/34

Primary Examiner—Arnold Rosenthal
Attorney—Richard C. Sughrue, Gideon Franklin Rothwell, John H. Mion et al.

[57] ABSTRACT

A two-way two position solenoid-operated valve has a valve member movable between open and closed positions, and having a central large orifice and a further, smaller, orifice communicating the valve inlet and outlet ports respectively with a chamber on the remote side of the valve member. The central orifice is fitted with a non-return ball valve which closes in response to pressure at the outlet port to effectively open the valve to unobstructed bidirectional flow when opened by its solenoid actuator.

3 Claims, 3 Drawing Figures

Patented June 12, 1973

INVENTOR
MARCO PERUGLIA

BY Sughrue, Rothwell, Mion, Zinn & Macpeak

ATTORNEYS

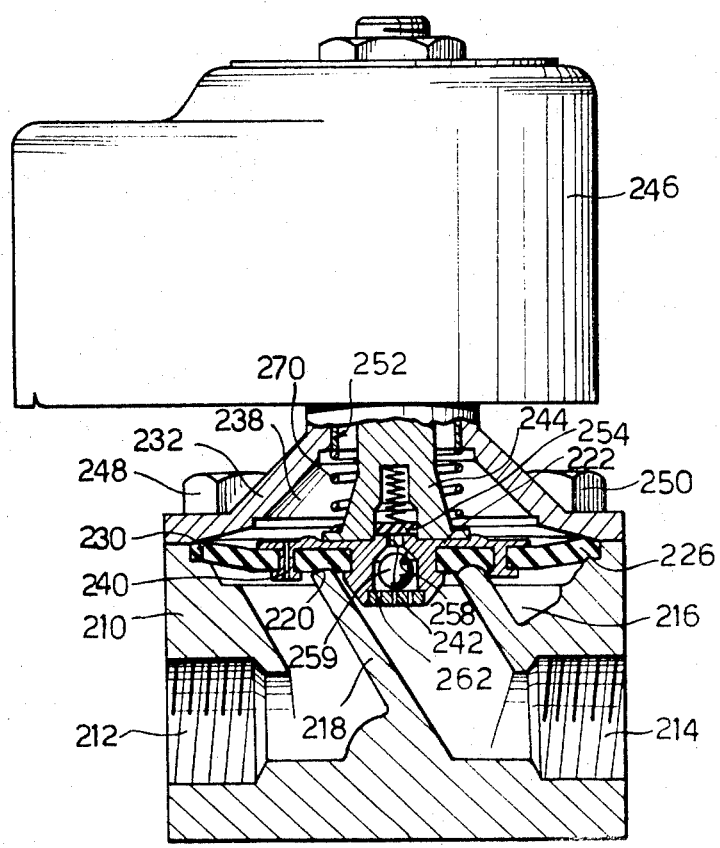

SOLENOID-OPERATED, TWO-WAY, TWO-POSITION VALVE WITH BIDIRECTIONAL FLOW

BACKGROUND OF THE INVENTION

The present invention relates to a two-way, two position electrically controlled valve.

The invention concerns more specifically an improvement in the two-way, two-position valve of the type employed for the switching of pneumatic circuits and incorporating a valve element freely movable between two positions. In one of these positions fluid under pressure is supplied to an inlet port of a working unit. The exhausting of the unit through this inlet port is normally prevented automatically, since backpressure from the unit cuts off communication between the pressure fluid supply and the unit itself, without the need for an electrical signal for such operation of the electrically operated valve.

Such a valve is, however, often inserted in an operative pneumatic circuit in which a bidirectional flow of fluid under pressure is required when the valve is open, closure of the valve being effected only upon reception of an external signal.

An object of the present invention is to provide for bidirectional flow of fluid under pressure in a two-way, two-position electrically controlled valve. The use of the valve according to the invention affords a number of advantages as hereinafter described.

SUMMARY OF THE INVENTION

According to the invention there is provided a two-way, two-position electrically controlled valve, comprising a valve body having a fluid flow passage between an inlet port and an outlet port, a movable valve member movable by electrical actuator means and engageable with a seat to obstruct the said flow passage, a chamber within the valve body and on the side of the valve member opposite the seat, said chamber communicating with the inlet port through a first orifice in the valve member and with the outlet port through a second orifice in the valve member of larger area than the first, so that in operation of the valve fluid under pressure from the inlet port passes through the second orifice creating in the said chamber a pressure lower than that which bears on the opposite side of the valve member, thereby holding the valve member in its open position spaced from the seat, wherein a non-return valve is provided, cooperating with the second orifice so as to allow free flow of fluid through the latter from the said chamber but to close said second orifice under pressure at the outlet port greater than that at the inlet port, thereby avoiding an undue pressure drop at the inlet port by fluid under pressure at the outlet port passing through the second orifice into the said chamber and, on account of the resistance to flow of fluid to the inlet port through the first orifice, causing pressure to build up in the chamber so as to thrust the valve member against the seat, so that unobstructed fluid flow through the open valve is permitted in either direction.

BRIEF DESCRIPTION OF THE DRAWINGS

The invention will be more clearly understood from the following description, given by way of non-limiting example, with reference to the accompanying drawings, in which:

FIG. 3 shows a valve according to the invention of the normally closed type.

DETAILED DESCRIPTION WITH REFERENCE TO THE DRAWINGS

Figure 1:
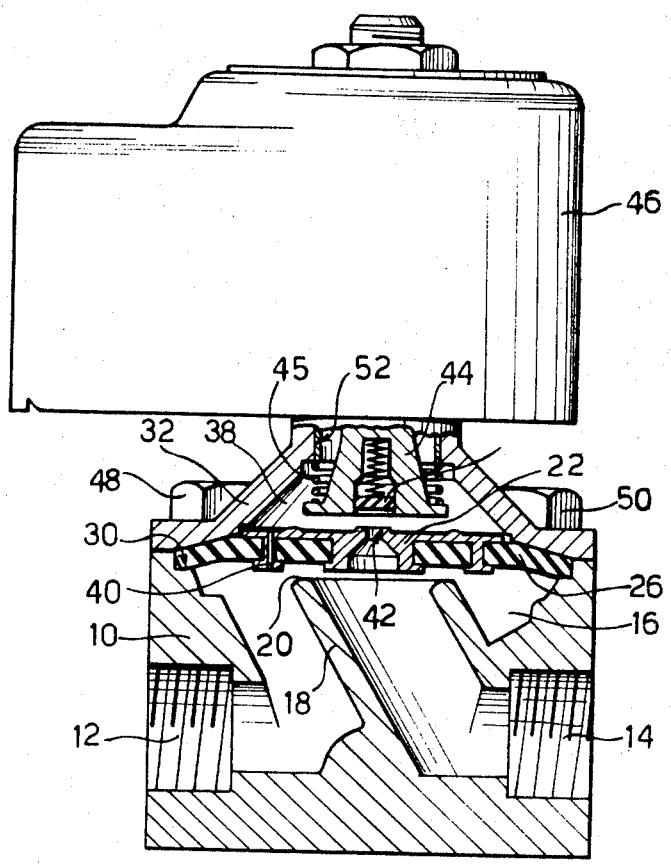
FIG. 1 illustrates partly in section a known two-way, two-position electrically controlled valve of the normally open type.

FIG. 1 shows a known electrically controlled pneumatic valve having a body 10 provided with internally threaded inlet and outlet ports 12, 14 respectively, both ports 12, 14 communicating with an internal chamber 16 in the body 10. The inlet port 12 is connectible to a fluid pressure source (not shown) and the outlet port 14 is connectible to a working unit (also not shown). An annular upstanding wall 18 in the chamber 16 surrounds the outlet port 14 and is provided with an annular valve seat 20 with which a valve member cooperates. The valve member comprises a flexible diaphragm 26 provided with a backing plate 22 on its face opposite that which cooperates with the seat 20. The diaphragm 26 is clamped at its outer periphery between an annular shoulder 30 on the valve body 10 and a cover 32 attached to the body 10 by means of screws 48 and 50. The cover 32, in addition to sealing the chamber 16, also forms a further chamber 38 on the opposite side of the valve member from the chamber 16.

A small diameter first orifice 40, which affords a substantial resistance to fluid flow therethrough, is provided in the valve plate 22 and interconnects the chamber 28 and the region of the chamber 16 adjacent the inlet port 12. A second orifice 42, of larger diameter than the orifice 40, is provided in the center of the valve plate 22 and affords substantially free flow of fluid between the chamber 38 and the outlet port 14.

Reference numeral 44 indicates part of the movable plunger of a solenoid (not shown) housed in a casing 46 which is formed integrally with or attached to the cover 32 of the valve. The plunger 44 projects into the chamber 38 through a central bore 52 in the cover 32 and is formed at its end within the chamber 38 with an annular flange. A helical tension spring 45 is interposed between the annular flange and the cover 32 to hold the end of the plunger 44 spaced from the valve plate 22, as shown, when the solenoid is de-energized, so that the valve is normally open. The end of the plunger 44 is provided with a spring-loaded resilient pad 54.

When the solenoid is energized the plunger 44 is moved towards the valve plate 22 and the pad 54 closes the second orifice 42 in the valve plate 22, and thrusts the diaphragm 26 into engagement with the seat 20, closing the outlet port 14.

When the solenoid is de-energized and the second orifice 42 is unobstructed by the pad 54, as shown in FIG. 1, and fluid under pressure can enter the chamber 16 through the inlet port 12. Since the diameter of the first orifice 40 is less than that of the second orifice 42, pressure does not build up in the chamber 38 and the diaphragm 26 remains spaced from the seat 20, permitting the unobstructed flow of fluid through the outlet port 14 to the working unit. Exhausting of fluid from the working unit is not, however, possible with this known valve, since the fluid under pressure returning from the working unit, or back-pressure from the unit, passes through the second orifice 42, and on account of the different areas of the orifices 40 and 42, pressure builds up in the chamber 38, causing the valve plate 22 to move the diaphragm 26 into sealing engagement with the seat 20, and interrupting the communication between the ports 12 and 14, as a result of which the working unit remains pressurized.

Figure 2:
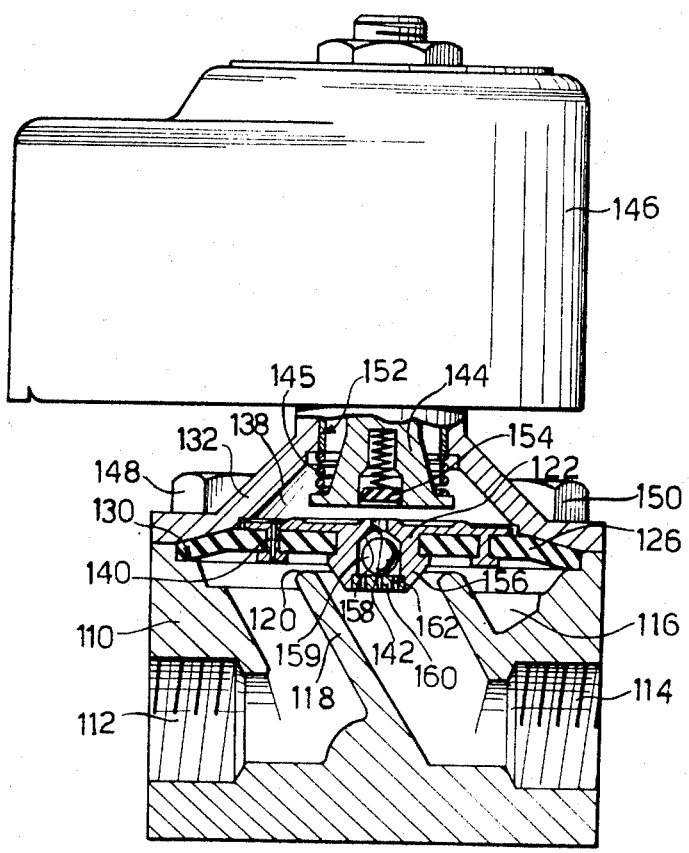
FIG. 2 is a corresponding part-sectional view of a valve according to one embodiment of the invention, also of the normally open type.

FIG. 2 shows a valve similar to that shown in FIG. 1, but improved by the present invention. Parts which are common to both FIGS. 1 and 2 are identified by the same reference numerals, as in FIG. 1, but increased by 100. The valve plate 122 has an extension 156 formed with a bore 158, substantially vertical in normal use of the valve, in which a non-return valve constituted by a ball 159 made of polytetrafluoroethylene or other material is lodged. The lower end of the bore 158 is covered by a small plate 160 provided with holes 162 which interconnect the bore 158 and the outlet port 114. The upper end of the bore 158 is bevelled to form a seat for the ball 159, and the second orifice 142 of the valve plate 122 communicates with the center of this seat.

By this arrangement, fluid under pressure arriving in the chamber 116 from the inlet port 112 moves the valve plate 122 and any fluid entering the chamber 138 through first the orifice 140 flows freely through the second orifice 142, the bore 158 and at least one of the holes 162 into the outlet port 114. On the other hand, returning fluid under pressure or back-pressure from the outlet port 114 enters the bore 158 through the holes 162, moves the ball 159 against its seat in the bore 158 and therefore obstructs the second orifice 142, thereby preventing the valve plate 122 from moving the diaphragm 126 against the seat 120. When the valve is open, therefore, fluid flow is permitted through in both directions.

FIG. 3 shows a valve similar to that of FIG. 2 but of the normally closed type, parts common to the valve of FIG. 2 being identified by the same reference numerals as in FIG. 2, but further increased by 100.

In this embodiment the spring 270 is a compression spring and holds the solenoid plunger 244 against the valve plate 222 when the solenoid is de-energized sealing the second orifice 242 in the latter and holding the diaphragm against the seat 220. Upon energization of the solenoid the plunger 244 is lifted against the action of the spring 270 and opens the valve, and bidirectional flow through the open valve is then permitted, as described previously with reference to FIG. 2.

We claim:

1. A two-way, two-position electrically controlled valve comprising:

a valve body having an inlet port, an outlet port, and a fluid flow passage between said ports;

a movable valve member;

electrical actuator means directly controlling said valve member;

a seat engageable by said valve member to obstruct the said flow passage;

a chamber within the valve body and on the side of said valve member opposite the seat;

a first orifice in the valve member communicating said chamber with said inlet port;

a second orifice in the valve member of larger diameter than said first orifice, communicating said chamber with said outlet port, whereby fluid under pressure from the inlet port may pass through said second orifice in operation of the valve and create in said chamber a pressure lower than that which bears on the opposite side of the valve member, thereby holding said valve member in its open position spaced from said seat, and non-return valve means cooperating with said second orifice for allowing free flow of fluid through the latter from said chamber, said non-return valve means closing said second orifice when pressure at said outlet port is greater than that at said inlet port to prevent an undesirable pressure buildup in said chamber.

2. Electrically controlled valve according to claim 1, wherein said non-return valve means comprises a ball located in a bore in the valve member and a perforated plate closing the end of said bore remote from said chamber.

3. Electrically controlled valve according to claim 2, wherein said non-return valve ball is made of polytetrafluoroethylene.

* * * * *